United States Patent [19]
Faraboschi et al.

[11] Patent Number: 5,864,692
[45] Date of Patent: Jan. 26, 1999

[54] METHOD AND APPARATUS FOR PROTECTING MEMORY-MAPPED DEVICES FROM SIDE EFFECTS OF SPECULATIVE INSTRUCTIONS

[75] Inventors: Paolo Faraboschi, Cambridge, Mass.; Alberto Such-Vicente, Barcelona, Spain

[73] Assignee: Hewlett-Packard Company, Palo Alto, Calif.

[21] Appl. No.: 767,449

[22] Filed: Dec. 16, 1996

[51] Int. Cl.⁶ ...................................................... G06F 9/34
[52] U.S. Cl. ............................................ 395/392; 711/163
[58] Field of Search ............................... 395/800.01, 392, 395/389, 580, 582, 591; 711/163

[56] References Cited

U.S. PATENT DOCUMENTS

| | | | |
|---|---|---|---|
| 5,511,172 | 4/1996 | Kimura | 395/375 |
| 5,526,499 | 6/1996 | Bernstein | 395/375 |
| 5,623,628 | 4/1997 | Brayton | 395/468 |
| 5,640,526 | 6/1997 | Mahin | 395/383 |
| 5,708,843 | 1/1998 | Abramson | 395/800.23 |

*Primary Examiner*—Eric Coleman

[57] ABSTRACT

A computer system includes a CPU for executing conventional instructions and speculative instructions, and a memory controller coupled to a system bus. In response to an access operation by one of the instructions, the CPU generates a speculative instruction bit and a corresponding access address. The access address represents a location in a global address space which includes a first address space and a second address space. The speculative instruction bit is asserted when the corresponding access address is generated by a speculative instruction. The memory controller discards the access operation when the speculative instruction bit is asserted and the access address is in the second address space. Thus, the speculative instruction is prevented from accessing the second address space. In one embodiment, the computer system includes a memory coupled to the system bus and mapped to the first address space, and an I/O device coupled to the system bus and mapped to the second address space. The speculative instruction is prevented from accessing the I/O device.

12 Claims, 6 Drawing Sheets

METHOD AND APPARATUS FOR PROTECTING MEMORY-MAPPED DEVICES FROM SIDE EFFECTS OF SPECULATIVE INSTRUCTIONS

FIELD OF THE INVENTION

This invention relates to computers which utilize instruction level parallelism and, more particularly, to computer systems which employ speculative execution of instructions for improved performance.

BACKGROUND OF THE INVENTION

One of the approaches to improving microprocessor performance is instruction level parallel processing. Instruction level parallel processing involves execution in parallel of low level machine operations, such as memory loads and stores, integer additions and floating point multiplications. Processors for implementing instruction level parallelism typically include multiple execution units and are controlled by very long instruction words (VLIW's). Each VLIW specifies the operations that are to be executed in a single cycle. The source program is typically written in a high level language without attention to operations that can be performed in parallel. The conversion of a source program to machine code which utilizes instruction level parallelism involves scheduling of operations which can be executed in parallel. The scheduling function may be performed by a compiler or by the processor itself. When scheduling is performed by the processor, the processor hardware may become complex. When scheduling is performed by the compiler, the processor simply executes the operations contained in the VLIW. Instruction level parallel processing is described by J. A. Fisher et al in *Science*, Vol. 253, Sep. 13, 1991, pp. 1233–1241 and by B. Ramakrishna et al in the *Journal of Supercomputing*, Vol. 7, 1993, pp. 9–50.

For maximum utilization of a processor having multiple execution units, each execution unit should perform an operation as often as possible. The execution units of the processor may be fully utilized during computation-intensive portions of a program, but other portions of the program may not require all the resources of the processor. In this case, instructions that appear later in the program may be scheduled for execution in parallel with earlier instructions, if the operands necessary for execution are available. Because branch instructions are usually present in the program, it may not be possible to determine in advance whether an instruction will require execution. However, if resources of the processor are otherwise idle, the performance of the processor may be improved by executing instructions speculatively, even though execution of those instructions may later be determined to be unnecessary. Execution of an instruction that follows a branch instruction before execution of the branch instruction is known as speculative execution. If the program ultimately requires execution of the instruction that was executed speculatively, an improvement in performance is obtained. If execution of the speculative instruction was not required, the result is discarded.

Speculative execution produces certain effects that must be accounted for in the operation of the processor. For example, if an error condition is generated during execution of the speculative instruction, the error condition should not be reported until a determination is made whether execution of the speculative instruction was required. This avoids processing an error for an instruction which is later discarded. Speculative execution is discussed by M. D. Smith et al in "Efficient Superscalar Performance Through Boosting", ASPLOS V, October, 1992, pp. 248–259; S. A. Mahlke et al, "Sentinel Scheduling for VLIW and Superscalar Processors", ASPLOS V, October, 1992, pp. 238–247 and by A. Rogers et al, "Software Support for Speculative Loads", ASPLOS V, October, 1992, pp. 38–50.

When a processor is connected to I/O devices or to other processors, speculative execution may produce unacceptable external effects. For example, when the processor uses a memory-mapped architecture and an I/O device is mapped to a region of the address space, a speculative memory access operation may accidentally address the region of the address space to which the I/O device is mapped and may cause undesired effects in the I/O device. The undesired effect may be produced simply by accessing a particular address. For example, if the I/O device is a printer, a speculative memory access operation may potentially cause a pen to be activated or an alarm to be sounded. It will be understood that a variety of different effects may be produced. Although execution of the speculative instruction may later be determined to be unnecessary, the effect produced in the I/O device cannot be undone. Thus, such side effects are unacceptable. Addressing of the I/O device by a speculative memory access operation is not intended by the programmer. Instead, such a speculative memory access operation occurs accidentally as a result of the compiler making the operation speculative.

SUMMARY OF THE INVENTION

According to a first aspect of the invention, a computer system comprises a central processing unit (CPU) for executing conventional instructions and speculative instructions, and a memory controller coupled to a system bus. The CPU includes means responsive to an access operation by one of the instructions for generating a speculative instruction bit and a corresponding access address. The access address represents a location in a global address space which includes a first address space and a second address space. The speculative instruction bit is asserted when the corresponding access address is generated by a speculative instruction. The memory controller discards the access operation when the speculative instruction bit is asserted and the access address is in the second address space. Otherwise, the memory controller accesses the address space. Thus, the speculative instruction is prevented from accessing the second address space.

In a first embodiment, the first address space comprises a memory address space and the second address space comprises an I/O address space. The computer system may further comprise a memory coupled to the system bus and mapped to the memory address space, and an I/O device coupled to the system bus and mapped to the I/O address space. The speculative instruction is prevented from accessing the I/O device.

In a second embodiment, the first address space comprises a dedicated memory space and the second address space comprises a shared memory space that may be accessed by another processor in a multiprocessor system. The computer system may further comprise a memory coupled to the system bus. The memory has a dedicated area mapped to the dedicated memory space and a shared area mapped to the shared memory space. The speculative instruction is prevented from accessing the shared memory space.

The memory controller may include a table containing addresses of the second address space and means for comparing the access address with the addresses of the second address space. The access operation is discarded when the address matches one of the addresses in the second address space and the speculative instruction bit is asserted.

According to another aspect of the invention, a method for protecting memory-mapped devices from side effects of speculative instructions in a computer system is provided. The computer system includes a CPU for executing conventional instructions and speculative instructions, and a memory controller for accessing an address space, including a first address space and a second address space, in response to an access address generated by the CPU. According to the method, the CPU generates a speculative instruction bit and a corresponding access address in response to an access operation by one of the instructions. The CPU asserts the speculative instruction bit when the corresponding access address is generated by a speculative instruction. The memory controller discards the access operation when the speculative instruction bit is asserted and the access address is in the second address space. The memory controller performs the access operation when the speculative instruction bit is not asserted or when the access address is in the first address space.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
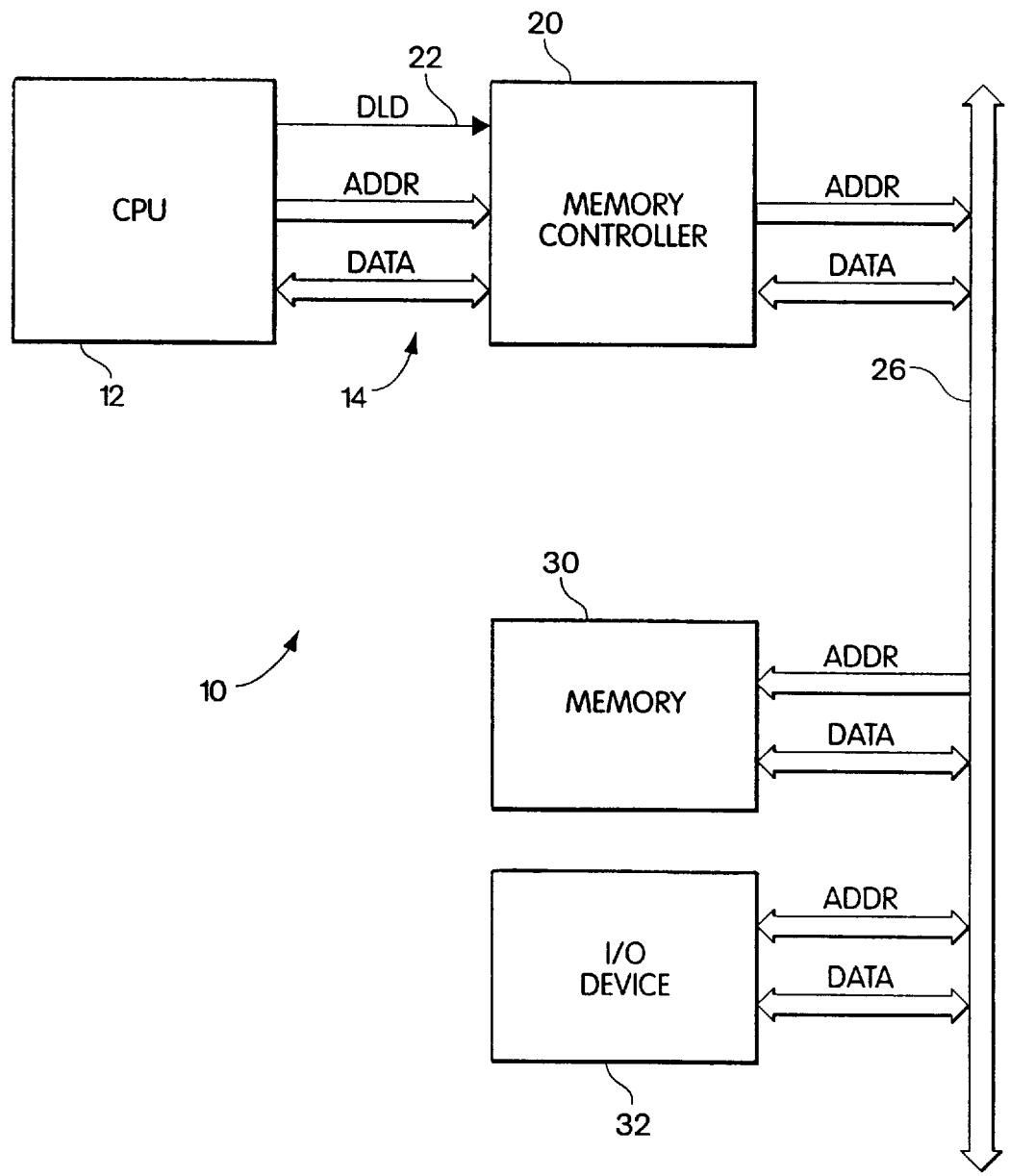
FIG. 1 is a block diagram of a first example of a computer system suitable for incorporation of the present invention.

A block diagram of an example of a memory-mapped computer system suitable for incorporation of the present invention is shown in FIG. 1. A computer system 10 includes a CPU 12 coupled by an external bus 14 to a memory controller 20. The external bus 14 includes address and data lines, and as discussed below, a dismissible load (DLD) line 22 which carries a DLD bit. The external bus 14 may include additional control lines (not shown) which are not relevant to the present invention. The memory controller 20 is coupled via a system bus 26 to a memory 30 and to an I/O device 32. The system bus 26 includes address lines by which the memory controller may address a location in memory 30 or I/O device 32 and data lines for passing data between memory controller 20 and memory 30 or I/O device 32. The memory 30 is typically a random access memory which contains instructions and data for a program being executed. The I/O device 32 may be any type of computer peripheral device or specialized device. In one example, the I/O device 32 may be a printer.

The computer system 10 has a memory-mapped configuration, wherein the CPU 12 can access a global address space. The global address space is divided into address spaces assigned to each of the devices attached to system bus 26. Thus, the global address space may include a memory address space and an I/O address space. The memory 30 is mapped to the memory address space, and the I/O device 32 is mapped to the I/O address space. When the CPU 12 performs a memory access operation, it issues an address in the memory address space. Similarly, when the CPU performs an I/O operation, it issues an address in the I/O address space. Other devices may be attached to the system bus 26 and may be mapped to other regions of the global address space. The memory controller 20 converts the address supplied by the CPU 12 on external bus 14 to an address suitable for accessing memory 30, I/O 32 or other devices connected to system bus 26.

Figure 2:
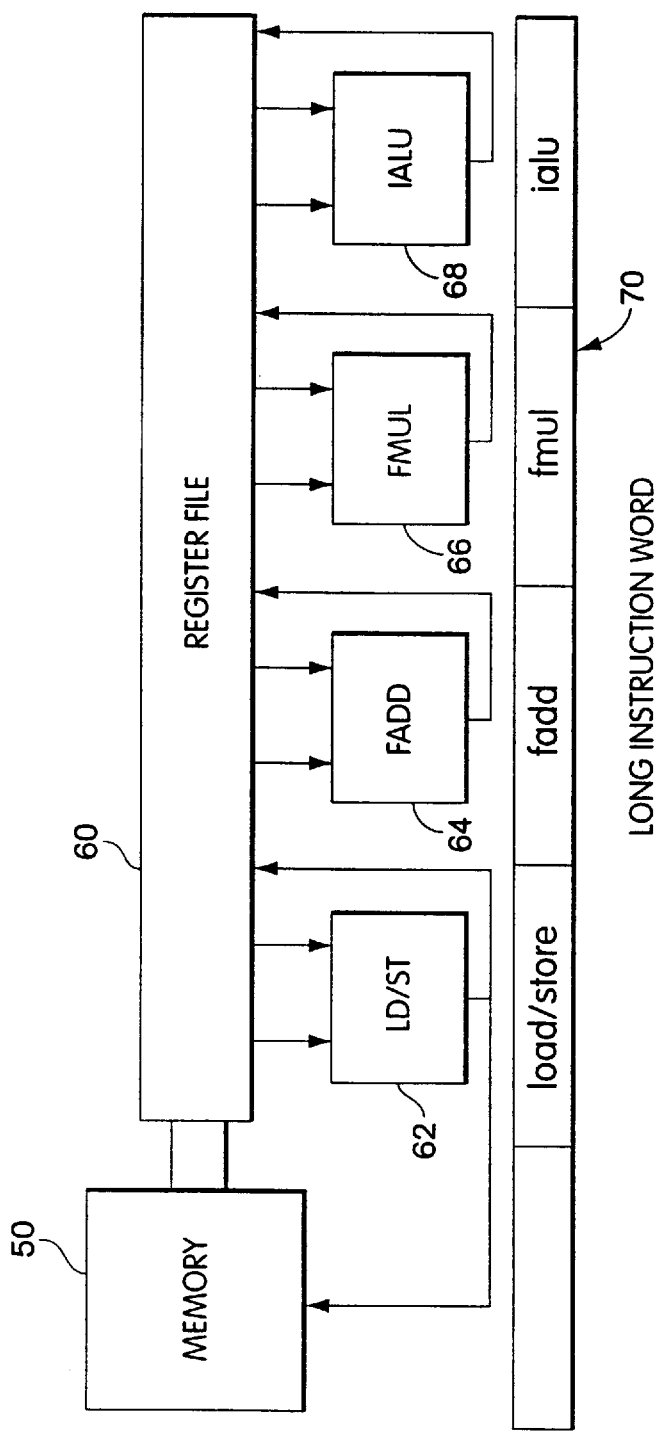
FIG. 2 is a block diagram of an example of the CPU shown in FIG. 1.

A block diagram of an example of the CPU 12 is shown in FIG. 2. The CPU 12 employs a very long instruction word (VLIW) architecture. A memory 50, typically an instruction cache, issues very long instruction words containing one or more instructions to an instruction decoder (not shown). The instruction decoder decodes each instruction and controls the operation of an execution block. The execution block may include a register file 60 and several execution units, such as a load/store unit 62, a floating point adder 64, a floating point multiplier 66 and an integer ALU 68. The memory 50 supplies wide instruction words 70 for execution of multiple operations in parallel. The register file 60 supplies operands to and stores results from execution units 62, 64, 66 and 68.

Figure 3:
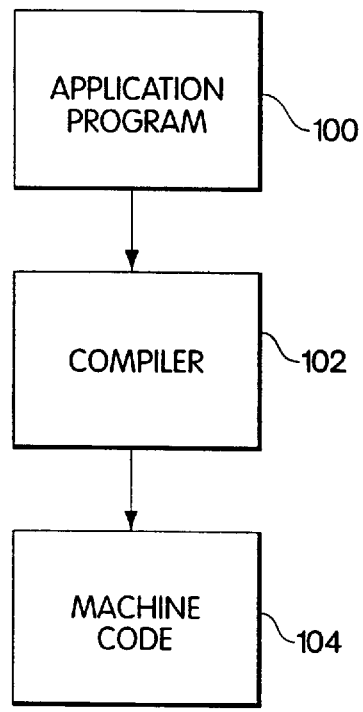
FIG. 3 is a flow diagram that schematically represents the operation of a very long instruction word compiler.

An application program is typically written for sequential execution without consideration of the VLIW architecture of the processor. The instructions of the application program are converted to VLIW words by a compiler as shown in FIG. 3. An application program 100 is input to compiler 102, which schedules operations and outputs machine code 104 in the form of VLIW words. The compiler 102 schedules operations in parallel for high utilization of the execution clusters. Operations are scheduled when the operands necessary for execution are available. Thus, instructions that appear later in the program may be scheduled earlier, or moved up, if the necessary operands are available. Furthermore, the compiler attempts to schedule instructions so as to avoid delays because of execution latencies. For example, an operation that requires several cycles to execute is scheduled earlier, so that the result will be available as soon as it is needed.

Despite such efforts at scheduling execution of operations in parallel, one or more execution units may be idle unless instructions are executed speculatively. A speculative instruction is one which follows a branch instruction. Until the branch instruction is executed, it cannot be determined with certainty whether execution of the speculative instruction will be required. If execution of the speculative instruction is required, performance is enhanced by executing it in parallel with other instructions. If execution of a speculative instruction is not required, little is lost because the execution unit would have been idle anyway. The probability of correctly selecting the speculative instruction for execution can be increased analyzing the program and its operation.

Figure 4:
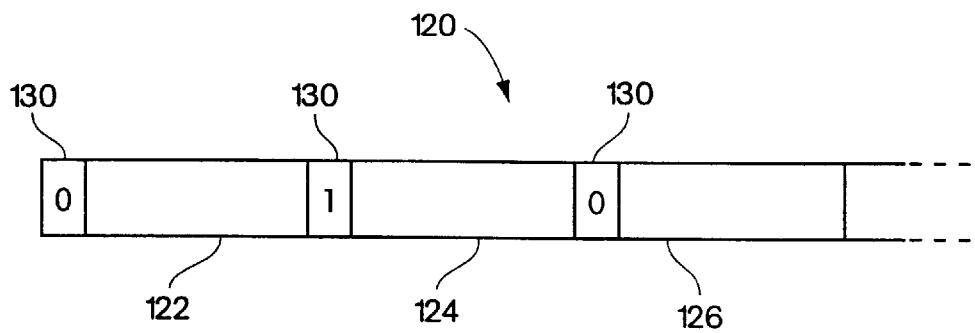
FIG. 4 is a schematic representation of a very long instruction word.

An example of a VLIW word 120 is shown in FIG. 4. The VLIW word contains instructions which specify the operations to be performed in a single cycle. Thus, an instruction 122 specifies an operation to be performed by a first execution unit, an instruction 124 specifies an operation to be performed by a second execution unit, an instruction 126 specifies an operation to be performed by a third execution unit, and so on, up to the maximum number of operations that can be performed in a single cycle. The number of instructions in the VLIW word is variable and in some cases may specify a single operation or a no-op. The instructions in the VLIW instruction word 120 are supplied by the memory 50 via the instruction decoder to the appropriate execution units 62, 64, 66 and 68. The compiler 102 includes with each instruction in the VLIW instruction word 120 an indicator, typically a bit 130, as to whether the instruction is a conventional (non-speculative) instruction or a speculative instruction. In the example of FIG. 4, instructions 122 and 126 are conventional instructions and instruction 124 is a speculative instruction, as indicated by the respective states of bit 130 in each instruction.

Execution of the speculative instruction may involve a variety of different operations. One of the operations that may be executed speculatively is a memory access operation, such as a memory load operation or a memory write operation. The memory access operations may occur when the data required by the speculative instruction is not contained in CPU 12, thus necessitating access to memory 30 (FIG. 1). A memory access operation during speculative execution is acceptable. However, for a variety of reasons, the speculative instruction may generate an address that falls within the I/O address space to which I/O device 32 is mapped. As indicated above, the accessing of an address in the I/O address space may cause undesired effects in I/O device 32. The effects are undesired because subsequent program execution may indicate that the result of the speculatively-executed instruction should be discarded and that the effect produced in the I/O device 32 was incorrect.

To avoid such undesired side effects of speculative execution, the CPU 12 provides a dismissible load (DLD) bit to memory controller 20 on DLD line 22. The DLD bit is synchronous with a corresponding address supplied by the CPU 12 to memory controller 20 on the address lines of external bus 14. The DLD bit indicates whether the instruction that generated the corresponding address is a conventional instruction or a speculative instruction, as indicated by bit 130 in the instruction. When the DLD bit is asserted, a speculative instruction is indicated.

Figure 5:
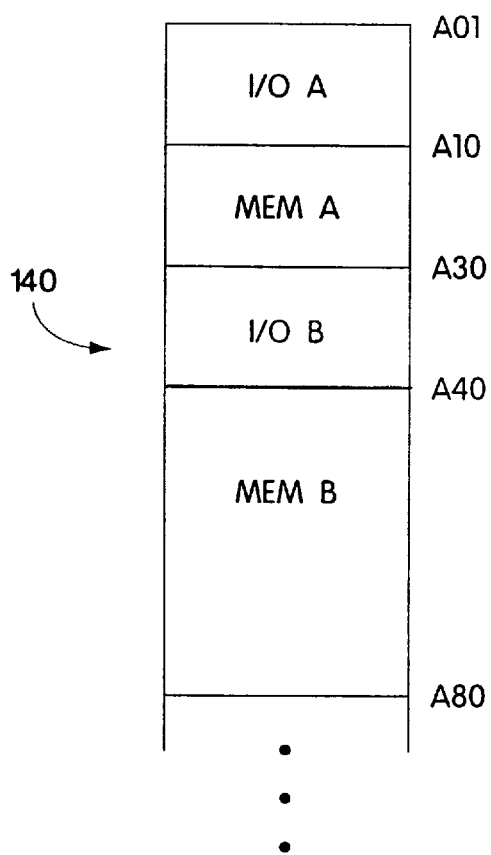
FIG. 5 is a schematic representation of a lookup table contained in the memory controller of FIG. 1.

The memory controller 20 contains a record of the address space allocation between memory 30 and I/O device 32, as well as any other devices that may be mapped to the global address space. The memory controller 20 may, for example, include a table indicating regions of the address space mapped to I/O devices and regions of the address space mapped to memory. In general, more than one I/O device and more than one memory may be connected to system bus 26. Each device, such as an I/O device, memory or other device, connected to system bus 26 may be mapped to a continuous region or to discontinuous regions of the global memory space. In the example of FIG. 5, I/O device A is mapped to address space A01–A09, and I/O device B is mapped to address space A30–A39. Memory A is mapped to address space A10–A29, and memory B is mapped to address space A40–A79. It will be understood that different address ranges and different numbers of address spaces will be utilized in different applications.

Figure 6:
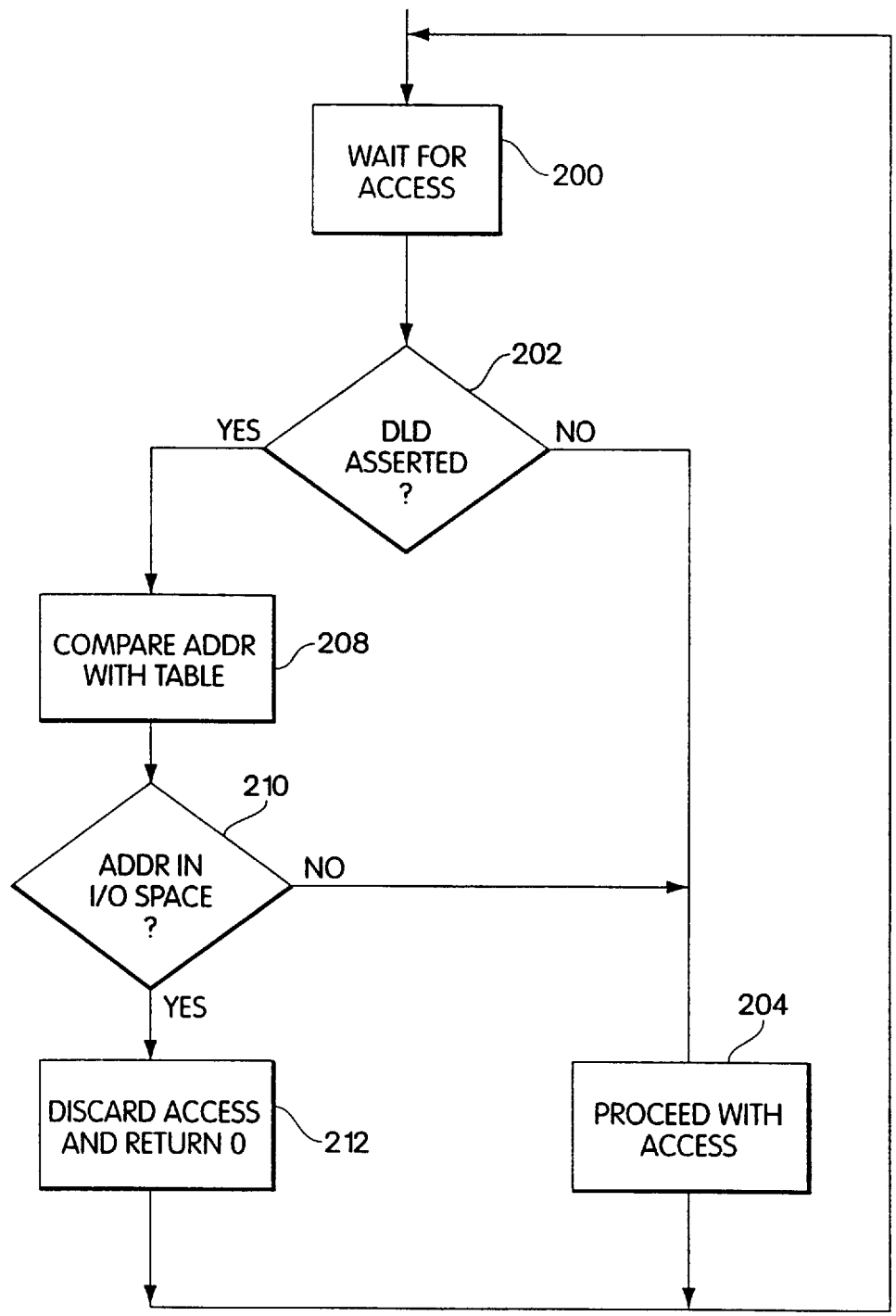
FIG. 6 is a flow chart that illustrates the operations performed by the memory controller during an access operation by the CPU.

A flow chart of the operations performed by memory controller 20 in controlling memory access operations is shown in FIG. 6. In step 200, memory controller 220 waits for a memory access operation by CPU 12. Upon receiving a memory access operation, the memory controller 20 determines in step 202 whether the DLD bit is asserted. As indicated above, assertion of the DLD bit indicates that the memory access operation was generated by a speculative instruction. When the DLD bit is not asserted, indicating a conventional instruction, the access operation is performed normally in step 204. The memory controller provides the requested address to the memory 30 or to the I/O device 32, and a read or write operation is performed. The memory controller 20 then returns to step 200 to wait for another access operation.

When the DLD bit is determined in step 202 to be asserted, the corresponding access address on external bus 14 is compared with table 140 in step 208. If the access address is determined in step 210 to fall within the I/O address space (addresses A01–A09 or A30–A39 in the example of FIG. 5), the access operation is discarded in step 212 and a value of 0 is returned by the memory controller 20 to the CPU 12 on the data lines of external bus 14. More specifically, discarding the access operation means that the memory controller 20 does not address the I/O address space and thus does not access I/O device 32. This insures that no undesired side effects can occur in I/O device 32.

If the access address is determined in step 210 not to fall within the I/O address space (i.e. the access address falls within the memory address space), the access operation is executed normally in step 204. Thus, a speculative load operation is permitted if the access address falls within the memory address space.

Figure 7:
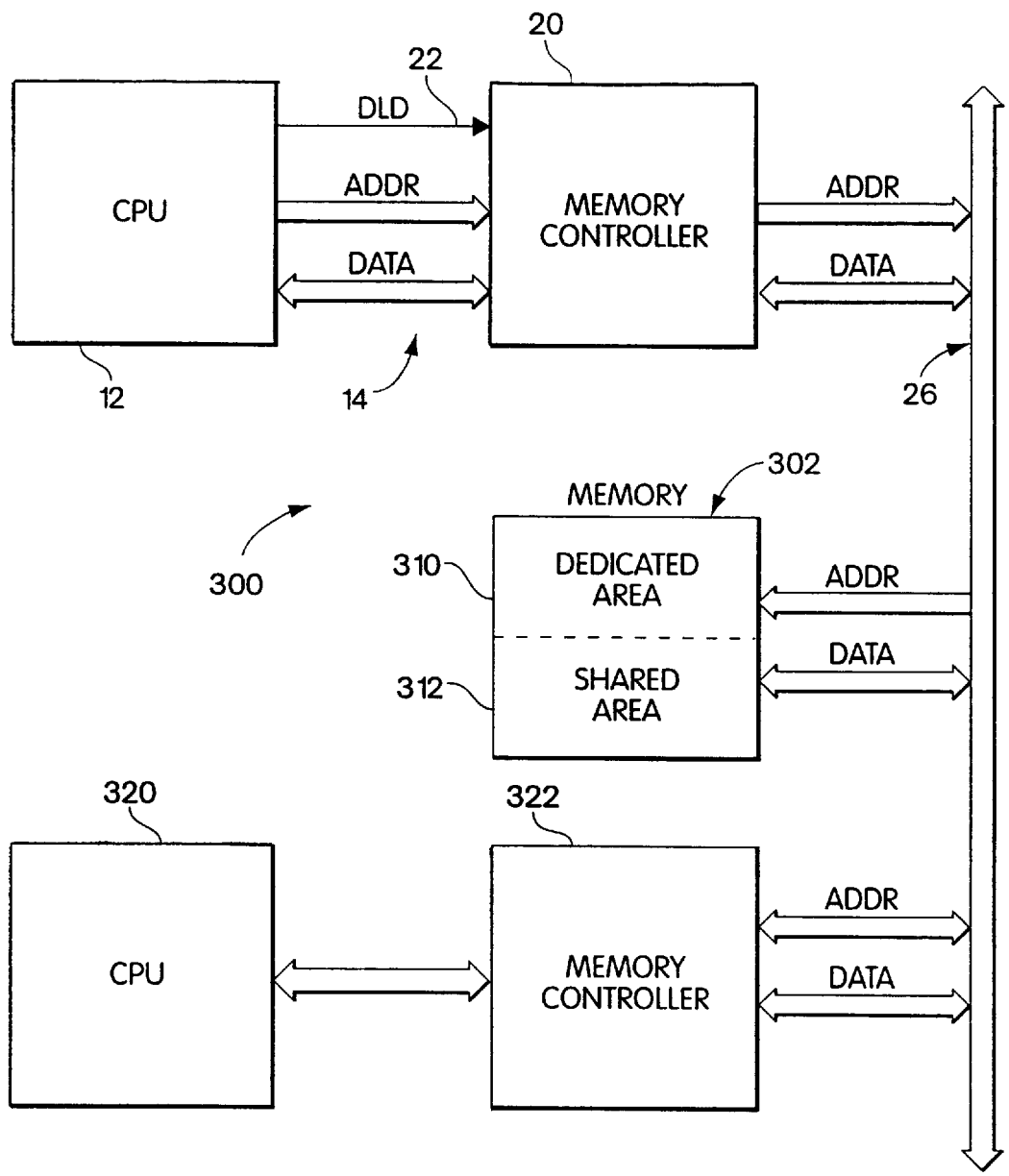
FIG. 7 is a block diagram of a second example of a computer system suitable for incorporation of the present invention.

A second example of a computer system suitable for incorporation of the present invention is shown in FIG. 7. Like elements in FIGS. 1 and 7 have the same reference numerals. A computer system 300 has a multiprocessing architecture. CPU 12 accesses a memory 302 via a memory controller 20 and system bus 26. The memory 302 includes a dedicated area 310 and a shared area 312. The dedicated area 310 is accessible only by CPU 12. The shared area 312 is accessible by CPU 12 and by a CPU 320 connected to system bus 26 via a memory controller 322. One or more additional CPU's (not shown) may have access to shared area 312.

The accessing of shared area 312 of memory 302 by a speculative access instruction being executed by CPU 12 may produce undesired side effects in CPU 320 or any other CPU that can access shared area 312. For example, accessing a particular location in shared area 312 may trigger an action in CPU 320. Because the instruction is speculative, such effects are undesired.

The procedure described above in connection with preventing undesired effects in an I/O device may be utilized to prevent speculative instructions from accessing the shared area 312. More particularly, the memory controller 20 contains a table of the addresses corresponding to shared area 312. When the DLD bit is set, indicating that the corresponding address was generated by a speculative instruction, the access address is compared with the addresses of shared area 312. When the speculative access operation provides an address in shared area 312, that access operation is discarded. When the speculative access operation accesses an address in dedicated area 310, the access operation is executed. Also, when the DLD bit is not asserted, indicating a conventional instruction, the access operation is executed. Thus, speculative instructions are prevented from accessing shared area 312.

In general, the DLD bit may be used to prevent a speculative instruction from accessing a portion of a global address space. When the DLD bit is asserted, the speculative instruction may access a first address space but is prevented from accessing a second address space within the global address space. When the DLD bit is not asserted, indicating a conventional instruction, either the first address space or the second address space may be accessed. Thus, undesired side effects of speculative execution are prevented.

The invention has been described in connection with VLIW processor architectures. However, the invention may be utilized in any processor architecture that uses speculative instructions.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A computer system comprising:
   a central processing unit (CPU) for executing conventional instructions and speculative instructions, said CPU including means responsive to an access operation by one of said instructions for generating a speculative instruction bit and a corresponding access address, said access address representing a location in a global address space which includes a first address space and second address space, said speculative instruction bit being asserted when the corresponding access address is generated by a speculative instruction; and
   a memory controller coupled to a system bus and responsive to said access address and said speculative instruction bit for discarding said access operation when said speculative instruction bit is asserted and said access address is in said second address space and for otherwise accessing said address space, wherein said speculative instruction is prevented from accessing said second address space.

2. A computer system as defined in claim 1 wherein said CPU includes means for generating said speculative instruction bit on a unique signal line.

3. A computer system as defined in claim 1 wherein said memory controller includes a table containing addresses of said second address space and means for comparing said access address with the addresses of said second address space, said access operation being discarded when said access address matches one of the addresses of said second address space and said speculative instruction bit is asserted.

4. A computer system as defined in claim 1 wherein said CPU includes a data cache and means for generating said speculative instruction bit when said access address bypasses said data cache.

5. A computer system as defined in claim 1 wherein said first address space comprises a memory address space and wherein said second address space comprises an I/O address space.

6. A computer system as defined in claim 5 further comprising a memory coupled to said system bus and mapped to said memory address space, and an I/O device coupled to said system bus and mapped to said I/O address space, wherein said speculative instruction is prevented from accessing said I/O device.

7. A computer system as defined in claim 1 wherein said first address space comprises a dedicated memory space and wherein said second address space comprises a shared memory space that may be accessed by another processor in a multiprocessor system.

8. A computer system as defined in claim 7 further comprising a memory coupled to said system bus, said memory having a dedicated area mapped to said dedicated memory space and a shared area mapped to said shared memory space, whereby said speculative instruction is prevented from accessing said shared memory space.

9. A method for protecting memory-mapped devices from side effects of certain speculative instructions in a computer system including a central processing unit (CPU) for executing conventional instructions and speculative instructions, and a memory controller for accessing a global address space, including a first address space and a second address space, in response to an access address generated by said CPU, comprising the steps of:
   said CPU generating a speculative instruction bit and a corresponding access address in response to an access operation by one of said instructions;
   said CPU asserting said speculative instruction bit when the corresponding access address is generated by a speculative instruction;
   said memory controller discarding said access operation when said speculative instruction bit is asserted and said access address is in said second address space; and
   said memory controller performing said access operation when said speculative instruction bit is not asserted or when said access address is in said first address space.

10. A method as defined in claim 9 wherein said memory controller includes a table containing addresses of said second address space and wherein the step of discarding said access operation includes comparing said access address with the addresses of said second address space and discarding said access operation when said access address matches one of the addresses of said second address space and said speculative instruction bit is asserted.

11. A computer system comprising:
    a memory coupled to a system bus;
    an I/O device coupled to said system bus;
    a central processing unit (CPU) for executing non-speculative instructions and speculative instructions which may subsequently be discarded, said CPU including means responsive to an access operation by one of said instructions for generating a speculative instruction bit and a corresponding access address, said access address representing a location in a global address space which includes a memory address space and an I/O address space, said memory being mapped to said memory address space and said I/O device being mapped to said I/O address space, said speculative instruction bit being asserted when the corresponding access address is generated by a speculative instruction; and
    a memory controller coupled to said system bus and responsive to said access address and said speculative instruction bit for discarding said access operation when said speculative instruction bit is asserted and said access address is in said I/O address space and for performing said access operation when said speculative instruction bit is not asserted or when said access address is in said memory address space, wherein said speculative instruction is prevented from accessing said I/O device.

12. A computer system as defined in claim 11 wherein said memory controller includes a table containing addresses of said I/O address space and means for comparing said access address with the addresses of said I/O address space in said table, said access operation being discarded when said access address matches one of the addresses of said I/O address space and said speculative instruction bit is asserted.

* * * * *